US007685569B2

(12) United States Patent
Basheer

(10) Patent No.: US 7,685,569 B2
(45) Date of Patent: Mar. 23, 2010

(54) NAVIGATION IN COMPUTER SOFTWARE APPLICATIONS DEVELOPED IN A PROCEDURAL LANGUAGE

(75) Inventor: Shafeek Basheer, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1960 days.

(21) Appl. No.: 09/797,456

(22) Filed: Mar. 1, 2001

(65) Prior Publication Data

US 2002/0166111 A1 Nov. 7, 2002

(51) Int. Cl.
 *G06F 9/44* (2006.01)
(52) U.S. Cl. .................................................. 717/123
(58) Field of Classification Search ......... 717/100–123, 717/168–170; 707/3–7, 200–205; 715/511–517, 715/520–525
See application file for complete search history.

(56) References Cited

U.S. PATENT DOCUMENTS 6,182,091 B1 * 1/2001 Pitkow et al. ............ 715/501.1

FOREIGN PATENT DOCUMENTS

| EP | 981097 A1 * | 2/2000 |
| JP | H 04-330522 | 11/1992 |
| JP | H 04-340130 | 11/1992 |
| JP | H 05-053786 | 3/1993 |
| JP | H10-083289 | 3/1998 |
| JP | H11-085483 | 3/1999 |
| JP | H 11-095988 | 4/1999 |
| JP | H11-296353 | 10/1999 |

OTHER PUBLICATIONS

Haas, "Page and Link Classifications: Connecting Diverse Resources", ACM, pp. 99-107, 1998.*
Dewell, "Cross System Product Application Generator Application Design", IBM System Journal, vol. 29, No. 2, pp. 265-273, 1990.*
Lai et al., "An Approach to Graph Layout to Assist in Web Navigation" IEEE, pp. 314-318, 1999.*
Linux, "Cross-Referencing Linux", http://web.archive.org/web/20001203134600/http://lxr.linux.no/blurb.html, pp. 1-3, Dec. 2000.*
Raymond, "Reading source code", ACM, Proceedings of the 1991 conference of the Centre for Advanced Studies on Collaborative research, pp. 3-16, 1991.*
Tompa et al., "Hypertext by Link-Resolving Components", ACM, pp. 118-130, 1993.*

(Continued)

*Primary Examiner*—Ted T Vo
(74) *Attorney, Agent, or Firm*—Schmeiser, Olsen & Watts; William H. Steinberg

(57) ABSTRACT

A method for providing a maintenance environment for computer program code is disclosed. According to the method, portions of the computer program code are selectively stored and one or more lists of the stored portions are created. Links are created between the lists and the stored portions of the computer program code for navigational purposes. A system for providing a maintenance environment for computer program code and a computer program product for the same purpose are also disclosed.

12 Claims, 7 Drawing Sheets

```
EZEM37                   STRUCTURE LIST                MORE: ->

==>
         ENTER = File and continue    PF3 = File and exit    PF4 = Refresh
                         Member Name = JFBB44B
   Select Definition:  S = P+F    P = Processing    F = Flow    E = Edit Object
                   O = Object Selection    Maximum => 006
   Total lines 0081 .. . . . . . . PROCESS AND GROUP LIST . . . . . . . . . . . . . . . . . .
   SEL   NAME                    LVL            OPTION       OBJECT        ERROR
   ***                           TOP OF LIST
   0S1   JFBB44P-MAIN            001            EXECUTE
   002   JFBB44P-EXE-INIT        002            EXECUTE
   003   JFCZZS-GET-SYSIN        003            GROUP
   004   JFCZZP-SCN-SYSIN        004            SCAN         JFCZZIN       EZERTN
   005   JFCZZP-ADD-SYSOUT       004            ADD          JFCZZOUT      EZERTN
   006   JFBB44P-INQ-R92         003            INQUIRY      JFBB44R92A    EZERTN
   007   JFBB44P-EXE-LDPIWI      003            EXECUTE
```

OTHER PUBLICATIONS

Oliver et al., "Teach Yourself HTML 4 in 24 Hours", Second Edition, Sams.net Publishing, pp. 37-50, 89-97, 1997.*

McCarthy et al., "Building Enterprise Web Transactions—using VisualAge Generator JavaBeans and JSPs", IBM Redbooks, pp. i-xxii, 1-393, May 2000.*

Devanbu et al., "CHIME: Customizable Hyperlink insertion and Maintenance Engine for Software Engineering Environments", 1999, ICSE '99, Los Angeles, CA, pp. 473-482.*

Kaiser et al., "An Architecture of WWW-based Hypercode Environments", Aug. 1996, Columbia University, NY, pp. 1-11.*

IBM, "VisualGen: The Future of Your VSE Applications And How You Get There from CSP", 1995, Internal Technical Support Organization, Boeblingen Germany, pp. i-xx, 1-163.*

Zeller, Andreas; Debugging with DDD; User's Guide and Reference Manual, First Edition, for DDD Version 3.2 last updated Jan. 3, 2000; 210 pages.

* cited by examiner

| EZEM37 | | STRUCTURE LIST | | | MORE: -> |
|---|---|---|---|---|---|
| ==> | | | | | |
| | ENTER = File and continue | | PF3 = File and exit | | PF4 = Refresh |
| | | Member Name = JFBB44B | | | |
| Select Definition: | S = P+F | P = Processing | F = Flow | E = Edit Object | |
| | O = Object Selection | | Maximum => 006 | | |
| Total lines 0081 . . . . . . . . . . . . PROCESS AND GROUP LIST . . . . . . . . . . . . . . . . . . . . . . . | | | | | |
| SEL | NAME | LVL | OPTION | OBJECT | ERROR |
| *** | | TOP OF LIST | | | |
| 0S1 | JFBB44P-MAIN | 001 | EXECUTE | | |
| 002 | JFBB44P-EXE-INIT | 002 | EXECUTE | | |
| 003 | JFCZZS-GET-SYSIN | 003 | GROUP | | |
| 004 | JFCZZP-SCN-SYSIN | 004 | SCAN | JFCZZIN | EZERTN |
| 005 | JFCZZP-ADD-SYSOUT | 004 | ADD | JFCZZOUT | EZERTN |
| 006 | JFBB44P-INQ-R92 | 003 | INQUIRY | JFBB44R92A | EZERTN |
| 007 | JFBB44P-EXE-LDPIWI | 003 | EXECUTE | | |

FIG.1

```
EZEM37                    STRUCTURE LIST                       MORE: ->
==> F JFBB44P-EXE-INIT
    ENTER = File and continue       PF3 = File and exit      PF4 = Refresh
                         Member Name = JFBB44B
Select Definition:   S = P+F    P = Processing    F = Flow    E = Edit Object
                     O = Object Selection   Maximum level=> 006 ............
Total lines 0081 ........... PROCESS AND GROUP LIST ....................
SEL  NAME              LVL        OPTION              OBJECT        ERROR
***                    TOP OF LIST
001  JFBB44P-MAIN      001        EXECUTE
002  JFBB44P-EXE-INIT  002        EXECUTE
```

FIG.2A

```
EZEM39                 APPLICATION PROCESS DEFINITION
==>
       PF3 = File and exit (or file and continue if more selected)
       PF4 = Validate and format           PF5 = Validate
Process = JFBB44P-MAIN                 Description = Main process
Option = EXECUTE
Total lines 0039 ........... STATEMENT DEFINITION ....................
```

FIG.2B

| FIG.2A |
|--------|
| FIG.2B |

FIG.2

```
***            TOP OF LIST
001  /*----------------------------------------
002  /* Monthly job to process commitment fee accruals
003  /*----------------------------------------
004  PERFORM JFBB44P-EXE-INIT;          /* Initialize Work storage
005  ..
006  /*
007  /* Use parm-value from T92
008  /*
009  PERFORM JFBB44P-EFF-DTE;
010  ..
011  IF JFCPIWI.APPL-RETURN-CODE EQ
012  ..
013  IF JFBB44I-UPDATE-DATE <= JFCPIWI.CURR-DTE; /* T92.  date < system date
014  ..
015     PERFORM FJBB44P-EXE-COMFEE;  /* Process Commitment fee billing
```

FIG.2B

NAVIGATION IN COMPUTER SOFTWARE APPLICATIONS DEVELOPED IN A PROCEDURAL LANGUAGE

FIELD OF THE INVENTION

The present invention relates generally to maintenance of computer software applications developed in a procedural language and more specifically to navigation in such software applications.

BACKGROUND

Cross System Product (CSP) is a form of procedural programing language, designed as a strategic application generator, by IBM, to provide consistent development and execution environments across multiple hardware platforms and operating systems. The CSP environment is very user friendly for application development and saves coding time by about 70%. However, maintenance of applications developed in CSP is not as easy as the development process in that environment. This is mainly because of the manner in which CSP is structured. CSP is a form of procedural programing language.

A CSP application program consists of various objects such as records, statement groups, processes, tables etc. The program code is written as a sequence of processes and statement groups. A typical application program has one or more main processes that call other processes or statement groups. These may, in turn, call other processes and/or statement groups.

An extract of a typical CSP program is shown in FIG. 1. The process at level 001 is the main process (ie. JFBB44P-MAIN), the contents of which can be viewed by insertion of the letter 'S' in the appropriate position in the SEL column, as shown in FIG. 1, followed by a carriage return (i.e. pressing the "Enter" key).

The content of the main process, which contains calls to other processes and statement groups, is shown in FIGS. 2A and 2B. To view and/or edit any particular process or statement group, a user is required to first return to the higher level structure list screen of FIG. 1 and then manually input the name of the particular process or statement group to be viewed and/or edited. A return to the higher level structure list screen of FIG. 1 is performed by pressing "PF3", a predefined computer keyboard function key. Selection of the process JFBB44P-EYE-INIT for viewing and/or editing is, as described above, shown at the top of FIG. 2A.

The above process will have to be repeated while navigating through the CSP program. If the program is large, with numerous sub-levels, navigation becomes even more difficult.

Viewing and/or editing any other objects like records or tables, necessitates returning to the list processor screen (this screen comes before the structure list screen shown in FIG. 1) for inputting of the name of the particular object.

These inherent difficulties make analysis and maintenance of program code developed in CSP a laborious task.

Consequently, a need clearly exists for an improved method and/or apparatus for analysis and maintenance of code written in CSP and other procedural languages that substantially overcomes or at least ameliorates one or more deficiencies of existing arrangements.

SUMMARY OF THE INVENTION

According to a first aspect of the present invention, there is disclosed a method for providing a maintenance environment for computer program code comprising the steps of:

selectively storing one or more portions of the computer program code;

creating one or more lists of one or more of the stored portions; and creating links for navigation of the computer program code, wherein each of the links is created between one of the stored portions and one of the lists.

According to a another aspect of the present invention, there is disclosed a computer system for providing a maintenance environment for computer program code comprising:

means for selectively storing one or more portions of the computer program code;

means for creating one or more lists of one or more of the stored portions; and means for creating links for navigation of the computer program code, wherein each of the links is created between one of the stored portions and one of the lists.

According to a further aspect of the present invention, there is disclosed a computer program product comprising a computer readable medium having a computer program recorded therein for providing a maintenance environment for computer program code, the computer program including:

computer program code means for selectively storing one or more portions of the computer program code to be maintained;

computer program code means for creating one or more lists of one or more of the stored portions; and computer program code means for creating links for navigation of the computer program code to be maintained, wherein each of the links are created between one of the stored portions and one of the lists.

The stored portions are preferably stored in separate computer files that are formatted for loading in a web-enabled browser program. The computer files may include a prologue file, a main file, process files, statement group files and record files, and are preferably HTML files.

BRIEF DESCRIPTION OF THE DRAWINGS

Features and preferred embodiments of the present invention are hereinafter described with reference to the accompanying drawings in which:

FIG. 1 shows a structure list of an exemplary CSP application program;

FIGS. 2A and 2B show a structure list of the main process of the CSP application program of FIG. 1;

DETAILED DESCRIPTION AND BEST MODE

The principles of the preferred method, system and computer program product described herein have general applicability to computer program code written in any procedural language. However, for ease of explanation, the preferred method, system and computer program product are described with reference to the Cross System Product (CSP) Language and HyperText Markup Language (HTML). It is not intended that the present invention be limited to the described method, system and computer program product. For example, the invention might have application to computer program code developed in procedural languages other than CSP and/or conversion of such program code to languages and/or environments other than Hyper Text Markup Language (HTML).

HTML documents or files are composed of plain ASCII text and thus do not contain control characters or embedded binary codes. A purpose of HTML is to define the structure of documents or files so that any web-enabled browser program will be able to interpret and display the document or file. HTML is defined by Standardized Generalized Markup Language (SGML), an international standard (ISO 8879) for text processing. SGML is a meta-language whose purpose is to define other languages.

An application program that has been generated in CSP can be exported to an External Source Format (ESF) file. EXPORT is a standard feature of CSP, enabling the entire CSP application program including processes, statement groups, records, etc, to be stored in ESF. An ESF file is a serial file consisting of 80-byte fixed-length records.

Figure 3:
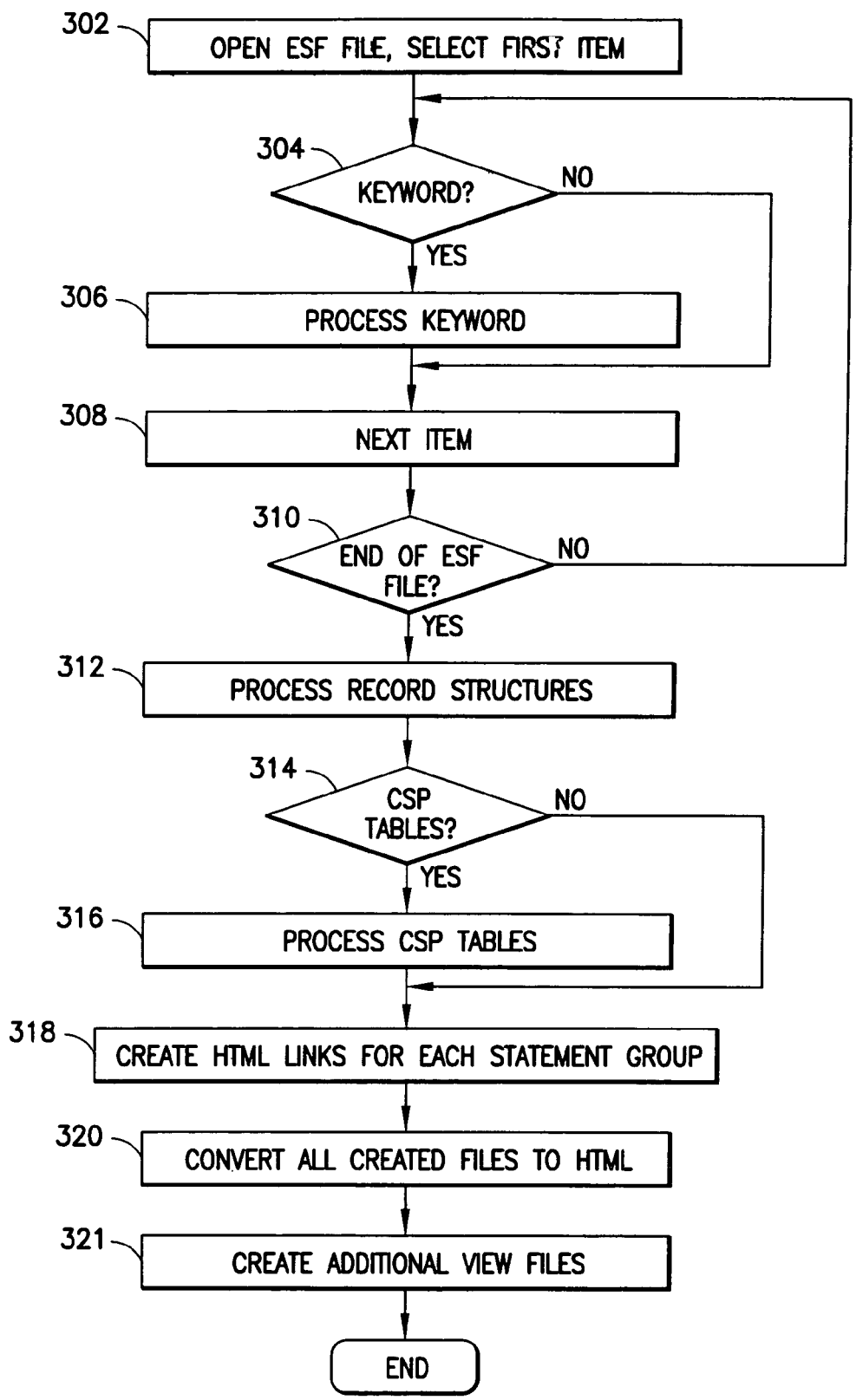
FIG. 3 shows a flowchart of a method for converting program code developed in CSP to HTML format.

FIG. 3 shows a flowchart of a method for converting program code developed in CSP to HTML format.

Figure 4:
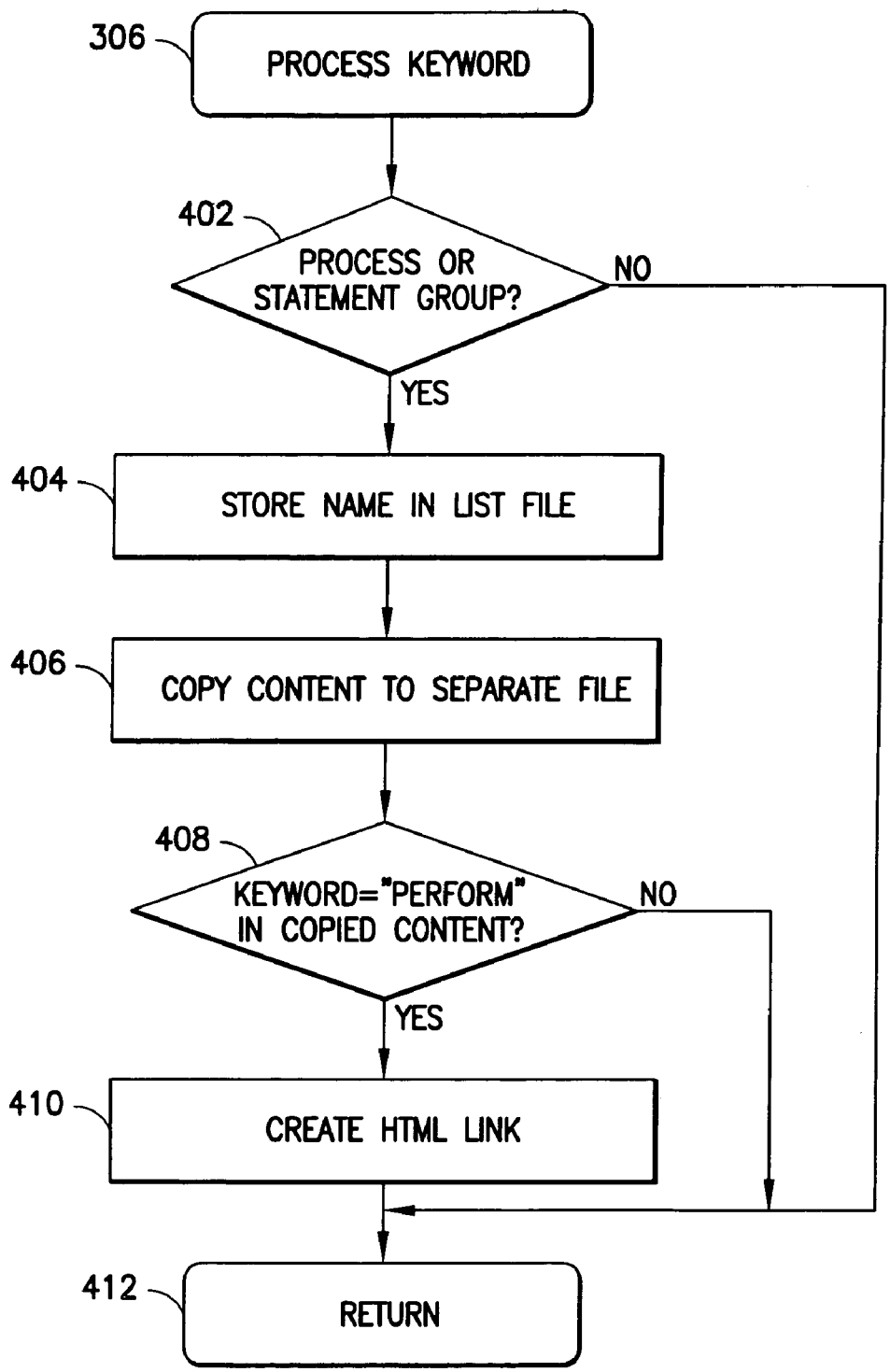
FIG. 4 shows processing of a CSP keyword in expanded detail to that shown in FIG. 3.

At step 302, the exported ESF file is opened and the first item is selected. If the selected item contains a pre-defined keyword (Y), at decision step 304, processing of the item occurs at step 306. Processing then continues at decision step 308. FIG. 4, and the description thereof, provide further detail of step 306 of FIG. 3. Examples of common keywords and the associated information obtained therewith are shown below:

| Keyword | Information obtained |
|---------|---------------------|
| :appl | Application name |
| :mapgroup | Map-group Name |
| :mainprc | Main Processes |
| :prol. | Prologue |
| :process | Process |
| :group | Statement Group |

If the selected item does not contain a keyword (N), at decision step 304, processing proceeds directly to step 312.

At step 308, the next item in the ESF file is selected. If it is determined that the end of the ESF file has not yet been reached (N), at decision step 310, processing reverts to step 304. However, if the end of the ESF file has been reached (Y), at decision step 310, processing continues at step 312.

Figure 5:
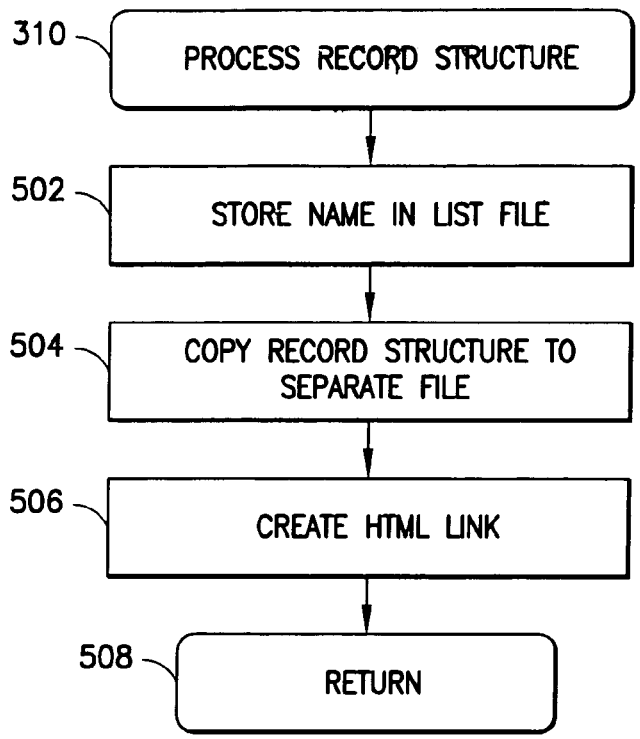
FIG. 5 shows processing of CSP record structures in expanded detail to that shown in FIG. 3.

Record structures, contained in the application program, are processed at step 312. FIG. 5, and the description thereof, provide further detail of step 312 of FIG. 3. Processing then proceeds to step 314.

Figure 6:
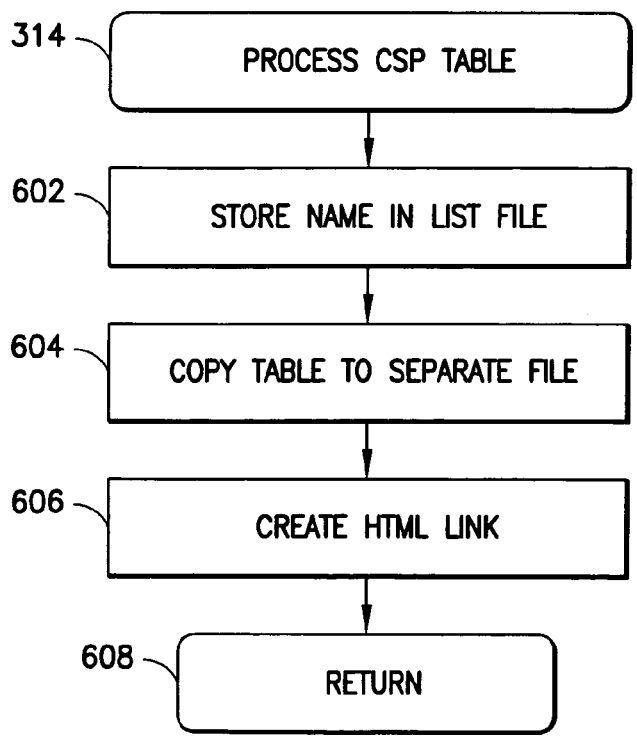
FIG. 6 shows processing of a CSP table in expanded detail to that shown in FIG. 3.

If the application program contains CSP tables (Y), at decision step 314, processing of the CSP tables occurs at step 316. FIG. 6, and the description thereof, provide further detail of step 316 of FIG. 3. Processing then proceeds to step 318.

At step 318, an HTML link is created for each statement group. As can be seen in FIG. 4, a statement group list file containing the names of all the statement groups and a separate file for each statement group would have been created and the purpose of the HTML links is to provide association and a navigation route between a particular statement group file and the name of that statement group contained in the statement group listfile.

Then, at step 320, all the created files are converted to HTML format by insertion of HTML tags in the files and renaming of the files to include the extension.htm. The created files typically include:
 process files
 statement group files
 prologue file
 main file with main process names list
 process names list file
 statement group names list file
 record files Finally, at step 321, other view files are created, as required. Examples of such view files include CSP view (this view is a tree view of the entire CSP application) and untersed (this view contains all the statement groups and processes in a single file for easy searching).

FIG. 4 shows processing of a CSP keyword in expanded detail to that shown in FIG. 3.

If the keyword represents a process or statement group (Y), at decision step 402, the name of the process or statement group is stored in the process name list file or the statement group name list file, respectively, at step 404.

Then, at step 406, the content of the process or statement group is copied to a separate file, of name the same as the particular process or statement group being copied.

If the keyword "PERFORM" (meaning a call to a process) is encountered in the copied content (Y), at decision step 408, an HTML link is immediately inserted that points to a file that has the same name as the process called by the "PERFORM" instruction.

Processing then returns to step 308 of FIG. 3, via step 412.

If the keyword did not represent a process or statement group (N), at decision step 402, processing also returns to step 308 of FIG. 3, via step 412. Similarly, if the key word "PERFORM" was not encountered in the copied content (N), at decision step 408, processing likewise returns to step 308 of FIG. 3, via step 412.

FIG. 5 shows processing of CSP record structures in expanded detail to that shown in FIG. 3.

Firstly, the name of the record structure is stored in the record structure name list file at step 502. Then, at step 504, the content of the record structure is copied to a separate file, of name the same as the particular record structure being copied.

Next, at step 506, a link is created between the name of the record structure contained in the record structure name list file and the file containing the specific record structure. The link is created using anchors.

Links, in HTML documents, are hotspots that, when clicked, redirect a browser program to a different document or resource within the same document. Anchors are links to a particular location within a single file. Thus, clicking on an anchor results in redirection to a predefined position in a file. Links and anchors are usually indicated by blue, underlined text but this is dependent on browser configuration.

Processing then returns to decision step 314 of FIG. 3 via step 508.

FIG. 6 shows processing of CSP tables in expanded detail to that shown in FIG. 3.

Firstly, the name of each CSP table is stored in the CSP table name list file at step 602. Then, at step 604, the content of each CSP table is copied to a separate file, of name the same as the particular CSP table being copied. Next, at step 606, a link is created between the name of the CSP table contained in the CSP table name list file and the file containing the specific CSP table. The link is created using anchors.

Processing then returns to step 318 of FIG. 3 via step 608.

Computer Implementation

Figure 7:
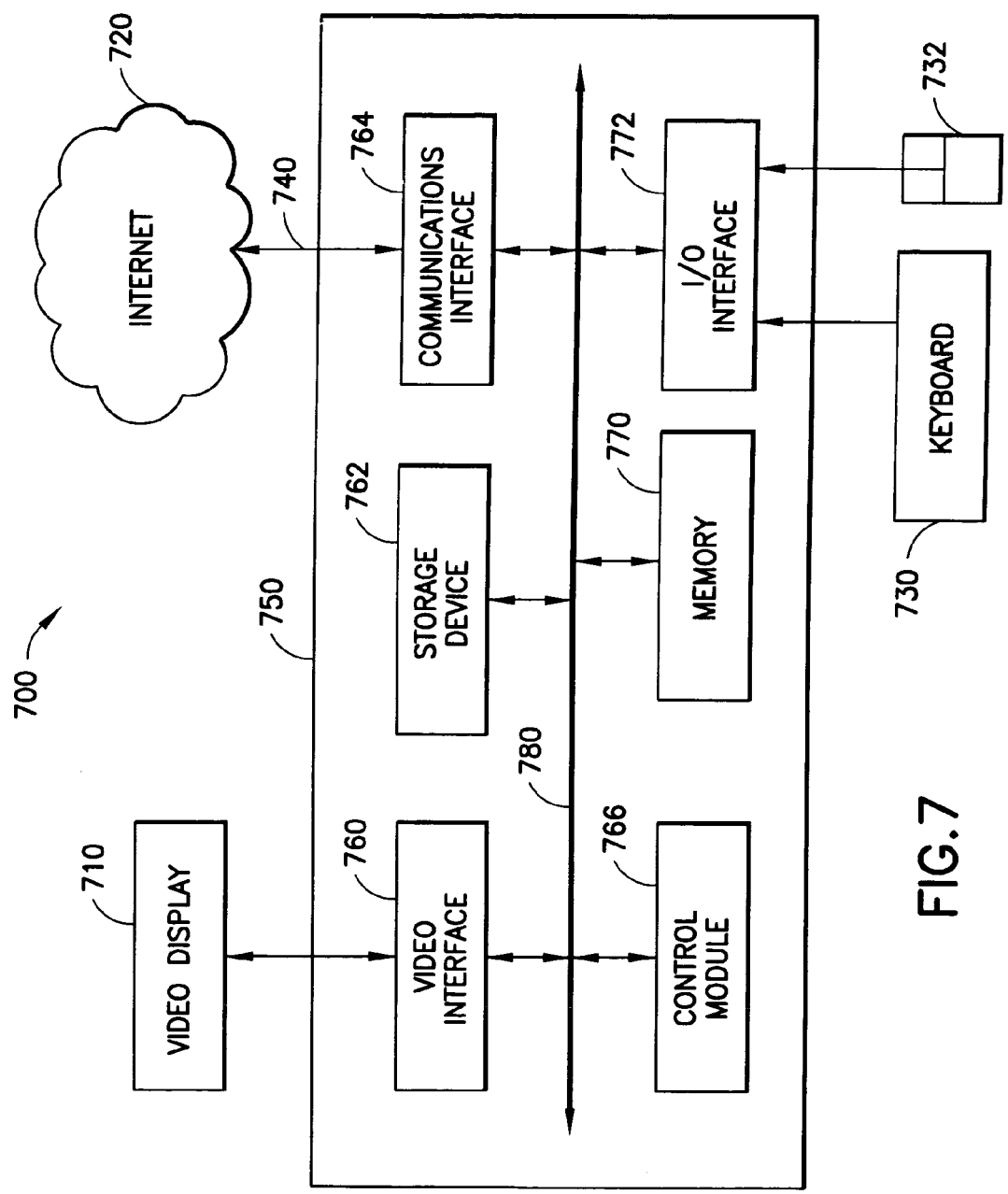
FIG. 7 shows a block diagram of an exemplary computer system on which the present invention may be practised.

The method for conversion of computer program code developed in CSP to HTML, or similar, can be implemented using a computer program product in conjunction with a computer system 700 as shown in FIG. 7. In particular, the method for conversion of computer program code developed in CSP to HTML, or similar, can be implemented as software, or computer readable program code, executing on the computer system 700.

The computer system 700 includes a computer 750, a video display 710, and input devices 730, 732. In addition, the computer system 700 can have any of a number of other output devices including line printers, laser printers, plotters, and other reproduction devices connected to the computer 750. The computer system 700 can be connected to one or more other computers via a communication interface 764 using an appropriate communication channel 740 such as a modem communications path, an electronic network, or the like. The network may include a local area network (LAN), a wide area network (WAN), an Intranet, and/or the Internet 720.

The computer 750 includes the control module 766, a memory 770 that may include random access memory (RAM) and read-only memory (ROM), input/output (I/O) interfaces 764, 772, a video interface 760, and one or more storage devices generally represented by the storage device 762. The control module 766 is implemented using a central processing unit (CPU) that executes or runs a computer readable program code that performs a particular function or related set of functions.

The video interface 760 is connected to the video display 710 and provides video signals from the computer 750 for display on the video display 710. User input to operate the computer 750 can be provided by one or more of the input devices 730, 732 via the I/O interface 772. For example, a user of the computer 750 can use a keyboard as I/O interface 730 and/or a pointing device such as a mouse as I/O interface 732. The keyboard and the mouse provide input to the computer 750. The storage device 762 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 750 is typically connected to other devices via a bus 780 that in turn can consist of data, address, and control buses.

The method steps for conversion of computer program code developed in CSP to HTML, or similar, are effected by instructions in the software that are carried out by the computer system 700. Again, the software may be implemented as one or more modules for implementing the method steps.

In particular, the software may be stored in a computer readable medium, including the storage device 762 or that is downloaded from a remote location via the interface 764 and communications channel 740 from the Internet 720 or another network location or site. The computer system 700 includes the computer readable medium having such software or program code recorded such that instructions of the software or the program code can be carried out.

The computer system 700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 766. Intermediate storage of the program code and any data including entities, tickets, and the like may be accomplished using the memory 770, possibly in concert with the storage device 762.

In some instances, the program may be supplied to the user encoded on a CD-ROM or a floppy disk (both generally depicted by the storage device 762), or alternatively could be read by the user from the network via a modem device connected to the computer 750. Still further, the computer system 700 can load the software from other computer readable media. This may include magnetic tape, a ROM or integrated circuit, a magneto-optical disk, a radio or infra-red transmission channel between the computer and another device, a computer readable card such as a PCMCIA card, and the Internet 720 and Intranets including email transmissions and information recorded on Internet sites and the like. The foregoing are merely examples of relevant computer readable media. Other computer readable media may be practised without departing from the scope and spirit of the invention.

The method for conversion of computer program code developed in CSP to HTML, or similar, can be realised in a centralised fashion in one computer system 700, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

CSP-Easy™ Implementation

A conversion program, named CSP-Easy™, is now described. The program supports conversion of CSP applications to HTML. CSP-Easy™ can be executed on Windows 95™ and Windows NT™ platforms.

After conversion, the CSP code can be viewed in a web browser such as Internet Explorer™ or Netscape Navigator™. Links are inserted to various objects such as processes, statement groups, records and tables. The different objects are colour-coded and underlined to further enhance readability and navigation of the code for software analysis and maintenance purposes.

Appendices 1 to 9 contain copies of exemplary HTML files generated from an exemplary CSP application by the CSP-Easy™ conversion program. Appendix 10 contains a copy of the CSP-Easy™ helpscreen, showing menu options for selecting the various HTML files for display in the browser window. Once an HTML file is displayed, a user can select any coloured and/or underlined reference to an object such as a process, statement group, record or table by clicking on that reference. The selected object will then be accessed and displayed.

Appendix 1 contains a copy of the start file, showing the names of the application and its main processes;

Appendix 2 contains a copy of the application prologue file;

Appendix 3 contains a copy of the process names list file;

Appendix 4 contains a copy of the statement group names list file;

Appendix 5 contains a copy of the record file;

Appendix 6 contains a copy of the main process file;

Appendix 7 contains a copy of an exemplary statement group file;

Appendix 8 contains a copy of the CSP view file, showing a tree view of the various processes and statement groups;

Appendix 9 contains a copy of an extract of the untersed file, showing a portion of the entire application program in a single file; and Appendix 10 contains a copy of the CSP-Easy™ help file.

The benefits of the CSP-Easy™ one-time conversion process from CSP to HTML include:

a) links to the various objects such as processes and statement groups enabling fast access;

b) a user-friendly interface offering easy access to all software objects such as records, tables, processes and statement groups at the click of a button;

c) colour-coding of the code of the various objects;

d) location of the CSP application in a Local Area Network (LAN) environment for faster access; and e) increased productivity due to faster analysis of the application code.

The foregoing describes only a few arrangements and/or embodiments of the present invention, and modifications and/or changes can be made thereto without departing from the scope and spirit of the invention, the arrangements and/or embodiments being illustrative and not restrictive.

APPENDIX 1

Application Name : APPLNAME

Mapgroup Name : MAPGRP

Main Process Is : MAIN-PROC.

APPENDIX 2

```
*************************************************  *
*                                                   *
* PROGRAM NAME: APPLNAME - Sample Program    *       00004
*                                                   *
*************************************************  *
*************************************************  *
* FUNCTION          : Sample Program         *       00004600
*                                            *       00004700
*                                            *       00004800
*                                            *       00004900
*                                            *       00005000
*              Screen Name: MAP-NAME.        *
*                                            *
*************************************************  *
*************************************************  *
* TRANSACTION      : 4J2810                  *
* MAP GROUP NAME   : MAPGRP                  *
* MAP NAME         : MAP-NAME                *
* DB2 PLAN NAME    : APPLNAME                *
*************************************************  *
```

APPENDIX 3

| MAIN-PROC | EXECUTE | | | 'Main Control Process'. |
|---|---|---|---|---|
| PROCESS-SCREEN-CONV | CONVERSE | MAP-NAME | | 'Converse the Map'. |
| PROCESS-UPD-R31U | UPDATE | JFBR9R31U | EZERTN | 'Update T31'. |
| PROCESS-REP-R31U | REPLACE | JFBR9R31U | EZERTN | 'Replace T31 with new ind.'. |
| PROCESS-SOX-R31U | SQLEXEC | JFBR9U31 | EZERTN | 'Set indicators for Enterprise'. |

APPENDIX 4

| STMTGRP-INIT | 'Initialize Application'. |
|---|---|
| STMTGRP-NLS | 'Put Fields Descriptions in Map'. |
| STMTGRP-PLACE-CURS | 'Place Cursor after Prompt'. |
| STMTGRP-PLACE-VALUE | 'Place Value after Prompt'. |
| STMTGRP-SET-BRIGHT | 'Set Map Attributes'. |
| STMTGRP-PREPARE-MAP | 'Prepare Map for Send'. |
| STMTGRP-UNDERSCORE | 'Fill Map Field with Underscore'. |
| STMTGRP-REM-US | 'Replace Underscores with Blank'. |
| STMTGRP-PFKEY | 'Execute Desired Function'. |
| STMTGRP-DEFINE | 'Reset Map Field Attributes'. |
| STMTGRP-CHK-CMND | 'Check Command Line'. |
| STMTGRP-CHK-ACT | 'Check Action Bar'. |
| STMTGRP-UPDATE | 'Set up Update Action'. |
| STMTGRP-PF4 | 'Handle Prompt for Screen'. |
| STMTGRP-PROMPT | 'Switch to Prompt Application'. |
| STMTGRP-PF5 | 'Refreshes Screen'. |
| STMTGRP-PROTECT | 'Set Map Field Attr. as Protect'. |
| STMTGRP-F11 | 'PF11 Processing'. |
| STMTGRP-CHK-SCREEN | 'Validate Values in Screen'. |

APPENDIX 5

Record Name is : RECORD1R

:prol.
```
***************************************************   *
                                                       *
     THE WORKING STORAGE of ONLY THIS PROGRAM          *
  This record is used to save the screen fields and other  *
  variables pertaining to CSP Application APPLNAME.    *
***************************************************   *
```

| NAME | LEVEL | OCCURS | SCOPE | TYPE | BYTES | DECIMAL | EVENSQL | DESC |
|---|---|---|---|---|---|---|---|---|
| * | 05 | 00001 | LOCAL | CHA | 02500 | 00 | N | |
| APPL-SAVE-FIELDS | 05 | 00001 | GLOBAL | | | | | |
| JFBR9-TITLE-36 | 10 | 00001 | LOCAL | CHA | 00030 | 00 | N | |
| JFBR9-TITLE-POS | 15 | 00036 | LOCAL | CHA | 00001 | 00 | N | |
| ACT | 10 | 00001 | GLOBAL | | | | | |
| SEL-1 | 10 | 00001 | GLOBAL | | | | | |
| F11-UPD | 10 | 00001 | LOCAL | CHA | 00007 | 00 | N | 'Function key CONFIRM' |
| F11 | 15 | 00001 | LOCAL | CHA | 00004 | 00 | N | 'Init F11 -' |
| F11-ACT | 15 | 00001 | LOCAL | CHA | 00003 | 00 | N | 'Action Related to F11' |
| COMM-LINE | 10 | 00001 | GLOBAL | | | | | |
| MESSAGE-TXT | 10 | 00001 | GLOBAL | | | | | |
| ITEM-ERR-CODE | 10 | 00050 | GLOBAL | | | | | |
| JFBR9I-CONM-ERR-CODE | 10 | 00001 | LOCAL | CHA | 00007 | 00 | N | |
| JFBR9I-ACT-ERR-COOE | 10 | 00001 | LOCAL | CHA | 00007 | 00 | N | |
| MESSAGE-NUM | 10 | 00001 | GLOBAL | | | | | |
| CUST-GROUP-NUM | 10 | 00001 | GLOBAL | | | | | |
| CUST-NUM | 10 | 00001 | GLOBAL | | | | | |
| PPT-SPEC-HANDLE | 10 | 00001 | LOCAL | CHA | 00001 | 00 | N | 'Billing Special Indicator' |
| SUPRESS-PRT-IND | 10 | 00001 | LOCAL | CHA | 00001 | 00 | N | |
| * | 10 | 00001 | LOCAL | CHA | 00923 | 00 | N | |

Record Name is : JFBR9W01

:prol.
THIS RECORD WILL HOLD WORKING ITEMS THAT ARE SPECIFIC
FOR THIS APPLICATION APPLNAME.

| NAME | LEVEL | OCCURS | SCOPE | TYPE | BYTES | DECIMAL | EVENSQL | DESC |
|---|---|---|---|---|---|---|---|---|
| JFBR9I-FIN-ENTERP-NUN | 10 | 00001 | LOCAL | BIN | 00004 | 00 | N | |
| ENTERPRISE-UPDT | 10 | 00001 | LOCAL | CHA | 00001 | 00 | N | |
| CUSTNUM-ONLY-UPDT | 10 | 00001 | LOCAL | CHA | 00001 | 00 | N | |
| JFBR9I-PF5-CNK | 10 | 00001 | LOCAL | CHA | 00007 | 00 | N | |

Record Name is : JFBR9WMR

| NAME | LEVEL | OCCURS | SCOPE | TYPE | BYTES | DECIMAL | EVENSQL | DESC |
|---|---|---|---|---|---|---|---|---|
| TX-UPDATE-6 | 10 | 00001 | LOCAL | CHA | 00006 | 00 | N | 'Update' |
| TX-JFBR9-TITLE-36 | 10 | 00001 | LOCAL | CHA | 00036 | 00 | N | ' ' |
| * | 15 | 00001 | LOCAL | CHA | 00030 | 00 | N | '       PPT Billing Control' |
| * | 15 | 00001 | LOCAL | CHA | 00006 | 00 | N | ' ' |
| TX-JFBR9-SEC-22 | 10 | 00001 | LOCAL | CHA | 00022 | 00 | N | ' ' |
| TX-ENT-NUM-35 | 10 | 00001 | LOCAL | CHA | 00025 | 00 | N | 'Enterprise Number:' |
| TX-ENT-COMMENT-1 | 10 | 00001 | LOCAL | CHA | 00040 | 00 | N | ' ' |
| * | 15 | 00001 | LOCAL | CHA | 00030 | 00 | N | '(All the customers under the E' |
| * | 15 | 00001 | LOCAL | CHA | 00010 | 00 | N | 'nterprise' |
| TX-ENT-COMMENT-2 | 10 | 00001 | LOCAL | CHA | 00034 | 00 | N | ' ' |
| * | 15 | 00001 | LOCAL | CHA | 00030 | 00 | N | 'entered will be updated with y' |
| * | 15 | 00001 | LOCAL | CHA | 00004 | 00 | N | 'our' |
| TX-ENT-COMMENT-3 | 10 | 00001 | LOCAL | CHA | 00038 | 00 | N | ' ' |
| * | 15 | 00001 | LOCAL | CHA | 00030 | 00 | N | 'PPT Special Handle and Suppres' |
| * | 15 | 00001 | LOCAL | CHA | 00008 | 00 | N | 's Print' |
| TX-ENT-COMMENT-4 | 10 | 00001 | LOCAL | CHA | 00008 | 00 | N | 'choice)' |
| TX-CUS--NUM-35 | 10 | 00001 | LOCAL | CHA | 00025 | 00 | N | 'Install Customer Number :' |
| TX-CUST-CONMENT-1 | 10 | 00001 | LOCAL | CHA | 00039 | 00 | N | ' ' |
| * | 15 | 00001 | LOCAL | CHA | 00030 | 00 | N | '(Only the Customer Number ente' |
| * | 15 | 00001 | LOCAL | CHA | 00009 | 00 | N | 'red will' |

APPENDIX 5-continued

| NAME | LEVEL | OCCURS | SCOPE | TYPE | BYTES | DECIMAL | EVENSQL | DESC |
|---|---|---|---|---|---|---|---|---|
| TX-CUST-COMMENT-2 | 10 | 00001 | LOCAL | CHA | 00039 | 00 | N | ' ' |
| * | 15 | 00001 | LOCAL | CHA | 00030 | 00 | N | 'be updated with your PPT Speci' |
| * | 15 | 00001 | LOCAL | CHA | 00009 | 00 | N | 'al Handle' |
| TX-CUST-COMMENT-3 | 10 | 00001 | LOCAL | CHA | 00027 | 00 | N | 'and Suppress Print choice)' |
| TX-PPT-SPEC-HANDLE | 10 | 00001 | LOCAL | CHA | 00025 | 00 | N | 'PPT Special Handle :' |
| TX-BILSPEC-COMMENT | 10 | 00001 | LOCAL | CHA | 00015 | 00 | N | '(Default is N)' |
| TX-SUPRESS-PRT | 10 | 00001 | LOCAL | CHA | 00025 | 00 | N | 'Suppress Printing :' |
| TX-SUP-PRT-COMMENT | 10 | 00001 | LOCAL | CHA | 00015 | 00 | N | '(Default is N)' |
| TX-COMMAND-8 | 10 | 00001 | LOCAL | CHA | 00008 | 00 | N | 'Command' |
| TX-F3-EXIT-7 | 10 | 00001 | LOCAL | CHA | 00007 | 00 | N | 'F3 = Exit' |
| TX-F4-PRMPT-8 | 10 | 00001 | LOCAL | CHA | 00008 | 00 | N | 'F4 = Prmpt' |
| TX-F5-REFR-7 | 10 | 00001 | LOCAL | CHA | 00007 | 00 | N | 'F5 = Refr' |
| TX-F11-UPD-7 | 10 | 00001 | LOCAL | CHA | 00007 | 00 | N | 'F11 = Upd' |

Record Name is : JFBR9W2

| NAME | LEVEL | OCCURS | SCOPE | TYPE | BYTES | DECIMAL | EVENSQL | DESC |
|---|---|---|---|---|---|---|---|---|
| COMSEC-DATA | 10 | 00001 | GLOBAL | | | | | |
| COUNTRY-CODE | 10 | 00001 | GLOBAL | | | | | |
| COUNTRY-NAME | 10 | 00001 | GLOBAL | | | | | |
| SUBSIDIARY-CODE | 10 | 00001 | GLOBAL | | | | | |
| SUBSIDIARY-NAME | 10 | 00001 | GLOBAL | | | | | |
| APPL-STACK-DATA | 10 | 00001 | GLOBAL | | | | | |
| FILLED-BY-APPL | 10 | 00001 | GLOBAL | | | | | |

Record Name is : JFBR9W3

| NAME | LEVEL | OCCURS | SCOPE | TYPE | BYTES | DECIMAL | EVENSQL | DESC |
|---|---|---|---|---|---|---|---|---|
| DATE-PORM | 10 | 00001 | GLOBAL | | | | | |
| DEC-POINT | 10 | 00001 | GLOBAL | | | | | |
| TIME-OF-LOGON | 10 | 00001 | GLOBAL | | | | | |

Record Name is : JFBR9W4

| NAME | LEVEL | OCCURS | SCOPE | TYPE | BYTES | DECIMAL | EVENSQL | DESC |
|---|---|---|---|---|---|---|---|---|
| JFBR9I-TOTAL-AREA | 10 | 00001 | LOCAL | CHA | 02500 | 00 | N | |
| JFBR9I-USERID | 15 | 00001 | LOCAL | CHA | 00008 | 00 | N | |
| * | 15 | 00001 | LOCAL | CHA | 02492 | 00 | N | |

Record Name is : JFBR9R31U

:prol.
USED FOR READ-FOR-UPDATE.

| NAME | LEVEL | OCCURS | SCOPE | TYPE | BYTES | DECIMAL | EVENSQL | DESC |
|---|---|---|---|---|---|---|---|---|
| FIN-ENTERP-NUM | | | GLOBAL | | | | | |
| CUST-GROUP-NUM | | | GLOBAL | | | | | |
| CUST-NUN | | | GLOBAL | | | | | |
| PPT-SPEC-HANDLE | | | LOCAL | CHA | 00001 | 00 | N | 'Billing Special Indicator' |
| SUPRESS-PRT-IND | | | LOCAL | CHA | 00001 | 00 | N | 'SUPRESS_PRT_IND' |
| CREATOR-ID | | | GLOBAL | | | | | |
| UPDATE-TIMESTAMP | | | GLOBAL | | | | | |

Record Name is : JFBR9U31

:prol.
Record for Enterprise Update in T31

| NAME | LEVEL | OCCURS | SCOPE | TYPE | BYTES | DECIMAL | EVENSQL | DESC |
|---|---|---|---|---|---|---|---|---|
| FIN-ENTERP-NUM | | | GLOBAL | | | | | |
| CUST-GROUP-NUM | | | GLOBAL | | | | | |
| CUST-NUM | | | GLOBAL | | | | | |
| PPT-SPEC-HANDLE | | | LOCAL | CHA | 00001 | 00 | N | 'Billing Special Indicator' |
| SUPRESS-PRT-IND | | | LOCAL | CHA | 00001 | 00 | N | 'SUPRESS_PRT_IND' |
| CREATOR-ID | | | GLOBAL | | | | | |
| UPDATE-TIMESTAMP | | | GLOBAL | | | | | |

APPENDIX 6

```
MAIN-PROC
Process Option : EXECUTE
Process Description : 'Main Control Process'.
Before Section
/*
/*-------------------------------------------------------------------  *
/*                     initialize transaction                          *
/*-------------------------------------------------------------------  *
STMTGRP-INIT;                          /* initialize application
MOVE 'APPLNAME' TO EZEAPP;
MOVE 'APPLNAME' TO RECPIWI.CURR-APPL;
;
/*-------------------------------------------------------------------  *
/*     Main loop - converse map while used on current maps.            *
/*-------------------------------------------------------------------  *
WHILE RECPIWI.CURR-APPL = EZEAPP;
    ;
    STMTGRP-PREPARE-MAP;               /* Prepare map for send
    ;
    PERFORM PROCESS-SCREEN-CONV;       /* Prepare and Converse
                                          map
    ;
    STMTGRP-PFKEY;                     /* Take care of the map
                                          handling
    ;
    JFCZZS-CHK-TSFR;                   /* Security check for
                                          next transaction
END;
;
/*-------------------------------------------------------------------  *
/*     Saint Entered Key to be checked By next Transaction             *
/*-------------------------------------------------------------------  *
MOVE ' ' TO RECPIWI.RESTART-CODE;
/*-------------------------------------------------------------------  *
/*          Finish this Transaction & Start another Transaction        *
/*-------------------------------------------------------------------  *
/*
;
JFDZZS-TSER-PGM;                       /* Transfer control to
                                          next transaction
```

APPENDIX 7

```
STMTGRP-CHK-SCREEN
Statement Group Descr is : 'Validate Values in Screen'.
/*************************************************************  *
/* CHECK VALUES ENTERED IN THE SCREEN MAP-NAME                  *
/*************************************************************  *
IF MAP-NAME.PPT-SPEC-HANDLE = ' ';
    OR MAP-NAME.PPT-SPEC-HANDLE = '_';
    MOVE 'N' TO MAP-NAME.PPT-SPEC-HANDLE;
    /* set prt-spec-handle to default
END;
IF MAP-NAME.SUPRESS-PRT-IND = ' ';
    OR MAP-NAME.SUPRESS-PRT-IND = '_';
    MOVE 'N' TO MAP-NAME.SUPRESS-PRT-IND; /* set supress-
    prt-ind to default
END;
IF MAP-NAME.PPT-SPEC-HANDLE ¬= 'Y';
    AND MAP-NAME.PPT-SPEC-HANDLE ¬= 'N';
    MOVE 'JFB4368' TO WX-EZEMNO; /* Ivalid values entered.
ELSE;
    IF MAP-NAME.SUPRESS-PRT-IND ¬= 'Y';
        AND MAP-NAME.SUPRESS-PRT-IND ¬= 'N';
        MOVE 'JFB4368' TO WX-EZEMNO; /* Ivalid values entered.
    ELSE;
        MOVE ' ' TO WX-EZEMNO;
    END;
END;
IF MAP-NAME.CUST-GROUP-NUM = ' ';
    OR MAP-NAME.CUST-GROUP-NUM = '_____';
    IF MAP-NAME.CUST-NUM = ' ';
        OR MAP-NAME.CUST-NUM = '_____';
        MOVE 'JF54361' TO WX-EZEMNO; /* Enter either Enterp.
        No. or Cust. No.
    ELSE;
```

APPENDIX 7-continued

```
        MOVE 'Y' TO JFBR9W01.CUSTNUM-ONLY-UPDT;
    END;
ELSE;
    IF MAP-NAME.CUST-NUM = ' ';
        OR MAP-NAME.CUST-NUM = '_____';
        MOVE 'Y' TO JFBR9W01.ENTERPRISE-UPDT;
    ELSE;
        MOVE 'JFB4362' TO WX-EZEMNO; /* Don't enter both
        Ent. No. or Cust. No.
    END;
END;
```

```
0001 MAIN-PROC STMTGRP
  0002 STMTGRP-NSL
    0003 STMTGRP-NSL
    0003 STMTGRP-PLACE-CUP
    0003 STMTGRP-PLACE-VALUE
    0003 STMTGRP-SET-BRIGHT
  0002 STMTGRP-PREPARE-MAP
    0003 STMTGRP-UNDERSCORE
  0002 PROCESS-SCREEN-CONV
    0003 STMTGRP-REM-US
  0002 STMTGRP-PFKEY
    0003 STMTGRP-DEFINE
    0003 STMTGRP-CHK-ACT
      0004 STMTGRP-UPDATE
      0004 STMTGRP-UPDATE
    0003 STMTGRP-CHK-ACT
      0004 STMTGRP-PROMPT
      0004 STMTGRP-PROMPT
      0004 STMTGRP-PLACE-CURS
      0004 STMTGRP-PLACE-CURS
      0004 STMTGRP-PLACE-CURS
    0003 STMTGRP-PFS
    0003 STMTGRP-PROTECT
    0003 STMTGRP-F11
      0004 STMTGRP-CHK-SCREEN
      0004 PROCESS-UPD-R31U
      0004 PROCESS-REP-R31U
      0004 PROCESS-SOX-R31U
```

APPENDIX 9

```
MAIN-PROC
Process Option : EXECUTE
Process Description : 'Main Control Process'.
Before Section
/*
/*-------------------------------------------------------------------  *
/*                     Initialize transaction                          *
/*-------------------------------------------------------------------  *
STMTGRP-INIT;                          /* Initialize application
MOVE 'APPLNAME' TO EZEAPP;
MOVE 'APPLNAME' TO RECPIWI.CURR-APPL;
;
/*-------------------------------------------------------------------  *
/*     Main loop - converse map while user on current map.             *
/*-------------------------------------------------------------------  *
WHILE RECPIWI.CURR-APPL = EZEAPP;
    ;
    STMTGRP-PREPARE-MAP;               /* Prepare map for send
    ;
    PERFORM PROCESS-SCREEN-CONV;       /* Prepare and Converse
                                          map
    ;
    STMTGRP-PFKEY;                     /* Take care of the map
                                          handling
    ;
    JFCZZS-CHK-TSFR;                   /* Security check for
                                          next transaction
```

APPENDIX 9-continued

```
END;
;
/*------------------------------------------------------------------- *
/*       Save Entered Key to be checked by next Transaction           *
/*------------------------------------------------------------------- *
;
MOVE '  ' TO RECPIWI.RESTART-CODE;
/*------------------------------------------------------------------- *
/*       Finish this Transaction & Start another Transaction          *
/*------------------------------------------------------------------- *
/*
;
JFDZZS-TSFR-PGM;                   /* Transfer control to
                                      next transaction
PROCESS-SCREEN-CONV
    Process Option        :        CONVERSE
    Process Object        :        MAP-NAME
    Process Description   :        'Converse the Map'.
Before Section
/************************************************************ *
/*                 CONVERSE THE MAP                            *
/************************************************************ *
After Section
STMTGRP-REM-US;
    PROCESS-UPD-R31U
    Process Option        :        UPDATE
    Process Object        :        JFBR9R31U
    Process Error         :        EZERTN
    Process Description   :        'Update T31'.
Before Section
MOVE 'USBT31' TO RECPIWI.USED-DB2-TABLE;
After Section
IF JFBR9R31U IS ERR;
    IF JFBR9R31U IS NRF;
       OR JFBR9R31U IS EOF;
    ELSE;
       MOVE 'JFBR9P_UPD_R31U' TO RECPIWI.SQL-ERR-IN-
       PROCES;
       MOVE JFBR9R31U.CUST-NUM TO RECPIWI.ERR-FOR-KEY-
       NUM(1);
       JFBZZS-DB2-ERROR;
    END;
END;
;
            SELECT
       FIN_ENTERP_NUM, CUST_GROUP_NUM, CUST_NUM,
       BILL_SPEC_IND, SUPRESS_PRT_IND, CREATOR_ID,
       UPDATE_TIMESTAMP
            INTO
       ?FIN-ENTERP-NUM, ?CUST-GROUP-NUM, ?CUST-NUM,
       ?PPT-SPEC-HANDLE, ?SUPRESS-PRT-IND, ?CREATOR-ID,
       ?UPDATE-TIMESTAMP
            WHERE
       FIN_ENTERP_NUM=?FIN-ENTERP-NUM
       AND CUST_NUM=?CUST-NUM
            FORUPDATEOF
       BILL_SPEC_IND, SUPRESS_PRT_IND, CREATOR_ID,
       UPDATE_TIMESTAMP
Table Used    : 'TABLE100'
Lable         : 'T1'
PROCESS-REP-R31U
    Process Option        :        REPLACE
    Process Object        :        JFBR9R31U
    Process Error         :        EZERTN
    Process Description   :        'Replace T31 with new ind.'.
Before Section
MOVE 'USBT31' TO RECPIWI.USED-DB2-TABLE;
After Section
IF JFBR9R31U IS HRD;
    IF JFBR9R31U IS NRF;
    ELSE;
       MOVE 'JFBR9P_REP_R43U' TO RECPIWI.SQL-ERR-IN-
       PROCES;
       MOVE JFBR9R31U.CUST-NUM TO RECPIWI.ERR-FOR-KEY-
       NUM(1);
       JFBZZS-DB2-ERROR;
    END;
ELSE;
```

APPENDIX 9-continued

```
       MOVE 'JFB4366' TO WX-EZEMNO; /* 'Entry updated. Enter new
values
END;
       SET
       BILL_SPEC_IND         =?PPT-SPEC-HANDLE,
       SUPRESS_PRT_IND       =?SUPRESS-PRT-IND,
       CREATOR_ID            =?CREATOR-ID,
       UPDATE_TIMESTAMP      = CURRENT TIMESTAMP
PROCESS-SQX-R31U
    Process Option        :        SQLEXEC
    Process Object        :        JFBR9U31
    Process Error         :        EZERTN
    Process Description   :        'Set indicators for Enterprise'.
After Section
IF JFBR9U31 IS ERR;
    IF JFBR9U31 IS NRF;
       OR JFBR9U31 IS EOF;
    ELSE;
       MOVE 'JFBR9P_SQX_R31U' TO RECPIWI.SQL-ERR-IN-
       PROCES;
       MOVE JFBR9U31.CUST-GROUP-NUM TO RECPIWI.ERR-
       FOR-KEY-NUM(1);
       JFBZZS-DB2-ERROR;             /* DP2 ERROR ROUTINE
    END;
ELSE;
    MOVE 'JFB4366' TO WX-EZEMNO; /* Entry updated.
    Enter new values
END;
            SQLEXEC
UPDATE
    TABLE100
SET
    BILL_SPEC_IND         = ?PET-SPEC-HANDLE,
    SUPRESS_PRT_IND       = ?SUPRESS-PRT-IND,
    CREATOR_ID            = ?CREATOR-ID,
    UPDATE_TIMESTAMP      =  CURRENT TIMESTAMP
WHERE
    FIN_ENTERP_NUM        = ?FIN-ENTERP-NUM AND
    CUST_GROUP_NUM        = ?CUST-GROUP-NUM
Table Used    : 'TABLE100'
Label         : 'T1'
STMTGRP-INIT
    Statement Group Descr is :               'Initialize
                                              Application'.
/************************************************************ *
/*                 INTITALIZE THE APPLICATION.                 *
/*                                                             *
/* This process will be executed only the first time map is shown *
/* on the screen.                                              *
/*                                                             *
/* So this could be:                                           *
/*                                                             *
/* 1) After the menu                                           *
/* 2) When this transection is started by another transaction  *
/* 3) After showing PROMPT - information                       *
/************************************************************ *
/*
JFBZZS-INIT;                       /* standard initialization
/*
SET JFBR9W01 EMPTY;
SET MAP-NAME EMPTY;
;
MOVE 'APPLNAME' TO RECPIWI.CURR-APPL;        /* Fill own
                                                applid
MOVE 'JFBR9AP' TO EZEAPP;
MOVE 'N' TO MAP-NAME.PPT-SPEC-HANDLE;        /*Set default
MOVE 'N' TO MAP-NAME.SUPRESS-PRT-IND;        /*Set default
;
MOVE RECPIWI.FIN-ENTERP-NUM TO JFBR9W01.JFBR9I-FIN-
ENTERP-NUM;
/*------------------------------------------------------------------- *
/*              Get the System Dat     -ISO-                          *
/*------------------------------------------------------------------- *
JFBZZS-SDATE;
/*------------------------------------------------------------------- *
MOVE JFCDRWIR.DATE1 TO MAP-NAME.CURR-DTE;
MOVE RECPIWI.RELEASE-NUM TO MAP-NAME.RELEAEE-NUM;
;
/*------------------------------------------------------------------- *
```

APPENDIX 9-continued

```
/*       Retrieve text fields for this panel from nls and store in     *
/*          jfbr9wmr ---- for National Language Support ----           *
/*-------------------------------------------------------------------- *
MOVE 'MAP-NAME' TO RECPIWI.PANEL-ID; /* Fill own Panelid
STMTGRP-NLS
;
MOVE '           ' TO RECORD1R.F11-UPD;
MOVE RECORD1R.F11-UPD TO MAP-NAME.TX-F11-UPD-7;
;
/*-------------------------------------------------------------------- *
/*                   --- Restart test --is:                            *
/*             coming from HELP or PROMPT program                      *
/*-------------------------------------------------------------------- *
IF RECPIWI.RESTART-CODE = 'P';            /* Return from prompt
    MOVE RECORD1R TO MAP-NAME;
    STMTGRP-PLACE-CURS; /* Place cursor back on field before
    IF RECPIWI.PROMPT-ITEM-VALUE NE '  ';
        STMTGRP-PLACE-VALUE;           /* Place value into field
                                                        cursor
    END;
    MOVE '  ' TO RECPIWI.RESTART-CODE;
END;
;
STMTGRP-SET-BRIGHT;
STMTGRP-NLS
    Statement Group Descr is :          'Put Fields Descriptions in
                                         Map'.
/***************************************************************** *
/*       Retrieve text fields from DB2 table in the correct language. *
/***************************************************************** *
/*-------------------------------------------------------------------- *
/*              Call National Language Support Application.            *
/*-------------------------------------------------------------------- *
CALL JFCNLAP RECPIMI,JFCNLMM (NOMAPS;
JFBP1S-CHK-RETCODE;
;
MOVE JFBR9WMR TO MAP-NAME;        /* Put the descriptions in
                                                the map
;
IF RECPIWI.APPL-RETURN-CODE ¬= '  ';
    MOVE RECPIMI.APPL-RETURN-CODE TO WX-EZEMNO;
END;
STMTGRP-PLACE-CURS
    Statement Group Descr is :          'Place Cursor after
                                         Prompt'.
/***************************************************************** *
/*             Place cursor after help or prompt                      *
/***************************************************************** *
/*-------------------------------------------------------------------- *
/*    Before help/prompt called, RECPIWI.ITEM-ID set to cursor        *
      location.                                                       *
/*    ITEM-ID is set in STMTGRP-PF4 (prompt).                         *
/*       The following 'values' must match for these processes.*      *
/*-------------------------------------------------------------------- *
IF 'ACT       ' = RECPIWI.ITEM-ID;
    SET MAP-NAME.ACT CURSOR;
END;
;
IF 'UPDATE' = RECPSWI.ITEM-ID;
    SET MAP-NAME.TX-UPDATE-6 CURSOR;
END;
;
IF 'CUST_GROUP_NUM' = RECPIWI.ITEM-ID;
    SET MAP-NAME.CUST-GROUP-NUM CURSOR;
END;
IF 'CUST_NUM' = RECPIWI.ITEM-ID;
    SET MAP-NAME.CUST-NUM CURSOR;
END;
IF 'PPT_SPEC_HANDLE' = RECPIWI.ITEM-ID;
    SET MAP-NAME.PPT-SPEC-HANDLE CURSOR;
END;
IF 'SUPRESS_PRT_IND' = RECPIWI.ITEM-ID;
    SET MAP-NAME.SUPRESS-PRT-IND CURSOR;
END;
IF 'MESSAGE_NUM' = RECPIWI.ITEM-ID;
    SET MAP-NAME.MESSAGE-NUM CURSOR;
END;
;
```

These Pages Have Been Created By

CSP-EASY!!!

The Easy Way to Analyse CSP

After running the CSP-Easy too; on the Exported file the following Views are available.

START This could be the starting point for analysing the CSP Application. The Main Processes are listed here. The Application name and the Mapgroup name is also shown here. To start analysing click on one of the Main processes.

PROLOGUE Click on this to view the Application Prologue.

CSP VIEW This gives a Tee View of the Various Processes and Statement groups giving the pictorial view of the flow of the Application. It also has the level number of the object.

PROCESSES Lists out all the Processes in the Application with relevant details like error handling, objects used and description.

STMT GROUPS Lists out all the Statement Groups in the Application with the description.

RECORDS Lists out all the Records used in the Application, click on the desired record to see details.

TABLES Lists out all the Tables used in the Application, click on the desired table to see details. If the Application doesn't have any tables, it gives a message to indicate that.

UNTERSED This view gives all the Processes and Statement groups in a single file, thus making it possible to search for the presence of a string in the entire application.

I claim:

1. A method for providing a maintenance environment for computer program code comprising the steps of:

a processor of a computer system exporting a software application program to an external file, wherein the computer program code comprises the software application program, wherein the software application program in the external file comprises a plurality of statement group keywords, wherein each statement group keyword represents a different statement group comprising a group of statements in the software application program in the external file, and wherein the external file is an External Source Format (ESF) file which is a serial file consisting of 80-byte fixed length records;

after said exporting, said processor storing a statement group name of each statement group in a statement group names list file and copying each statement group to a different statement group file whose name is the statement group name of the statement group being copied, wherein each statement group name in the statement group names list file is associated with a corresponding statement group file resulting from said copying each statement group to a different statement group file; and after said storing the statement group name of each statement group and said copying each statement group to the different statement group file, said processor placing a link in the statement group names list file for each statement group name therein to provide an independent association and a navigation route between each statement group name in the statement group names list file and its associated statement group file.

2. The method of claim 1, wherein the external file further comprises a plurality of process keywords, wherein each process keyword represents a different executable process in the software application program in the external file, and wherein the method further comprises:

after said exporting, storing a process name of each process in a process names list file and copying each process to a different process file whose name is the process name of the process being copied, wherein each process name in the process names list file is associated with a corresponding process file resulting from said copying each process to a different process file; and after said storing the process name of each process and said copying each process to the different process file, placing a link in the process names list file for each process name therein to provide an independent association and a navigation route between each process name in the process names list file and its associated process file.

3. The method of claim 2, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first statement group keyword.

4. The method of claim 2, wherein the software application program in external file comprises a first keyword, and wherein the method comprises:

making a first decision that the first keyword is either a first statement group keyword comprised by the plurality of statement group keywords or a first process keyword comprised by the plurality of process keywords; and after said making the first decision, making a second decision that the first keyword is the first process keyword.

5. The method of claim 2, wherein the statement groups are at different levels in a level structure in the software application program, wherein the processes in the software application program are at different levels in the level structure, wherein each different level in the level structure has an associated level number, and wherein the method further comprises displaying a single tree view of the statement groups and processes that depicts the statement group name of each statement group, the process name of each process, and the level number of each statement group and process.

6. The method of claim 2, wherein after said placing a link in the process names list file for each process name therein, the process names list file comprises said link for each process name therein and text describing the statement associated with each process name therein.

7. The method of claim 1, wherein the software application program in the external file further comprises a plurality of record structure keywords, and wherein each record structure keyword represents a different structure of records in the external file;

after said exporting, storing a record structure name of each record structure in a record structure names list file and copying each record structure to a different record structure file whose name is the record structure name of the record structure being copied, wherein each record structure name in the record structure names list file is associated with a corresponding record structure file resulting from said copying each record structure to a different record structure file; and after said storing the record structure name of each record structure and said copying each record structure to the different record structure file, placing a link in the record structure names list file for each record structure name therein to provide an independent association and a navigation route between each record structure name in the record structure names list file and its associated record structure file.

8. The method of claim 1, wherein the software application program in the external file further comprises a plurality of table keywords, and wherein each table keyword represents a different table in the external file;

after said exporting, storing a table name of each table in a table names list file and copying each table to a different table file whose name is the table name of the table being copied, wherein each table name in the table names list file is associated with a corresponding table file resulting from said copying each table to a different table file; and after said storing the table name of each table and said copying each table to the different table file, placing a link in the table names list file for each table name therein to provide an independent association and a navigation route between each table name in the table names list file and its associated table file.

9. The method of claim 1, wherein the software application program in the external file further comprises a prologue table keyword representing a prologue in the software application program in the external file;

after said exporting, storing a prologue name of the prologue in a prologue name file and copying the prologue to a prologue file whose name is the prologue name of the prologue being copied, wherein the prologue name in the prologue file is associated with the prologue file resulting from said copying the prologue; and after said storing the prologue name and said copying the prologue to the prologue file, placing a link in the prologue name file for the prologue name therein to provide an association and a navigation route between the prologue name in the prologue list file and its associated prologue file.

10. The method of claim 1, wherein after said placing a link in the statement group names list file for each statement group name therein, the statement group names list file consists of said link for each statement group name therein and text describing the statement group associated with each statement group name therein.

11. The method of claim 1, wherein the software application program in the external file further comprises a map-group keyword representing a map-group name of a map group in the software application program in the external file.

12. The method of claim 1, wherein the software application program is a Cross System Product (CSP) software application program, and wherein each link is a HyperText Markup Language (HTML).

* * * * *